2,954,292
Patented Sept. 27, 1960

2,954,292

PHOTOGRAPHIC DESENSITISING COMPOUNDS

George Frank Duffin and John David Kendall, Ilford, England, assignors to Ilford Limited, Ilford, England, a British company No Drawing. Filed Sept. 29, 1958, Ser. No. 763,785

Claims priority, application Great Britain Oct. 4, 1957

4 Claims. (Cl. 96—101)

This invention relates to the production of direct positive emulsions.

There has already been described a method of producing a direct positive emulsion in which there is incorporated in a silver chloride emulsion, which is substantially free from silver bromide or silver iodide, a proportion of a desensitising compound and the emulsion is fogged by light or chemical means. When an emulsion so produced is thereafter exposed and developed, a positive image is directly produced.

In fact, however, suitable desensitising compounds for the aforesaid process are quite rare. Compounds selected from benzthiazole, quinoline, indolenine, benztriazole and rhodanine compounds, and their alkyl quaternary salts, having a nitro group attached to a benzene nucleus, have been prepared, as have also compounds such as 4-(m-nitrostyryl) cinnoline methyl p-toluene sulphonate and 4-(m-nitrostyryl) quinazoline methyl p-toluene sulphonate.

According to the present invention a direct positive photographic material comprises a silver chloride emulsion which has been fogged by light or by chemical means and which includes a desensitising compound of the general formula:

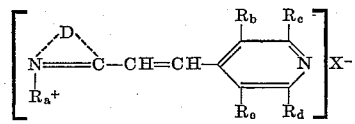

where D is the residue of a five-membered or six-membered heterocyclic nitrogen nucleus, $R_a$ is an alkyl or aralkyl group, $R_b$, $R_c$, $R_d$ and $R_e$ are hydrogen atoms or alkyl, aryl or aralkyl groups, and X is an anion.

D may be the residue, for example, of an oxazole, thiazole, selenazole, or a polycyclic homologue thereof such as those of the benzene and naphthalene series, pyridine or a polycyclic homologue thereof such as quinoline and α- and β-naphthoquinolines, indolenine, pyrimidine, quinazoline, pyridazine, oxazoline, thiazoline or selenazoline. The cyclic residues referred to may contain substituents on the carbocyclic or heterocyclic rings, e.g. one or more alkyl, aryl, amino, hydroxy, alkoxy, methylene dioxy, alkylthio, or nitro groups or halogen atoms.

$R_a$ is preferably a lower alkyl group, e.g. containing up to 4 carbon atoms, and may include a hydroxy substituent. $R_b$, $R_c$, $R_d$ and $R_e$ when not hydrogen atoms are preferably lower alkyl groups containing up to 4 carbon atoms.

The aforesaid compounds are prepared, according to a further feature of this invention, by reacting a compound of the general formula:

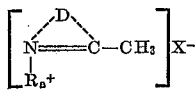

with an aldehyde of the formula:

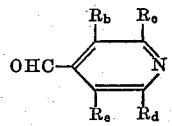

The reaction is preferably effected in an inert diluent medium and most advantageously in the presence of a base such as piperidine.

The following are examples of the production of compounds for use according to the invention:

EXAMPLE 1

2-2'-4"-pyridylvinyl-3-ethylbenzothiazolium iodide

Pyridine-4-aldehyde (5.1 g.), 2-methyl-3-ethylbenzothiazolium iodide (14.5 g.) and ethanol (50 ml.) were boiled under reflux. As soon as all the solid had dissolved piperidine (0.3 ml.) was added and boiling continued for twenty minutes. The mixture was cooled to room temperature and the precipitated solid was filtered off and washed well with ethanol. Recrystallisation from methanol gave the pure product as orange rhombic crystals, M. Pt. 208°.

EXAMPLE 2

1-methyl-3-methylthio-6-4'-pyridylvinylpyridazinium iodide

1:6-dimethyl-3-methylthiopyridazinium iodide (2.54 g.), pyridine-4-aldehyde (1.07 g.) and ethanol (10 ml.) were boiled under reflux until all the iodide had dissolved and piperidine (0.1 ml.) added. After boiling for 20 minutes, the solution was cooled to precipitate a solid which was filtered off and recrystallised from ethanol to give the pure product as orange needles, M. Pt. 192° C.

EXAMPLE 3

1-ethyl-3-methylthio-6-4'-pyridylvinylpyridazinium iodide was obtained by the method of Example 2 from 1-ethyl-6-methyl-3-methylthiopyridazinium iodide and pyridine-4-aldehyde and crystallised from ethanol to give orange needles, M. Pt. 180-2° C.

EXAMPLE 4

1:3-dimethyl-6-4'-pyridylvinylpyridazinium iodide was obtained by the method of Example 2 from 1:3:6-trimethylpyridazinium iodide and pyridine-4-aldehyde and crystallised from ethanol as red needles, M. Pt. 191-3° C.

EXAMPLE 5

1-ethyl-3-methyl-6-4'-pyridylvinylpyridazinium iodide was obtained by the method of Example 2 from 1-ethyl-3:6-dimethylpyridazinium iodide and pyridine-4-aldehyde and crystallised from ethanol as orange needles, M. Pt. 125-6° C.

EXAMPLE 6

1:3:3-trimethyl-2-2'-4"-pyridylvinylindoleninium iodide was obtained from 1:2:3:3-tetramethylindolenium iodide and pyridine-4-aldehyde by a method similar to that of Example 1 and crystallised from methanol as orange plates, M. Pt. 221° (d.).

EXAMPLE 7

1-ethyl-2-2'-4"-pyridylvinylquinolinium iodide was obtained from quinaldine ethiodide and pyridine-4-aldehyde by a method similar to that of Example 1 and crystallised from methanol as yellow needles, M. Pt. 221° (d.).

EXAMPLE 8

1-methyl-2-2'-4"-pyridylvinylbenzothiazolium iodide was obtained from 2:3-dimethylbenzothiazolium iodide and pyridine-4-aldehyde by a method similar to that of Example 1 and crystallised from 2-methoxyethanol as orange needles, M. Pt. 210° (d.).

EXAMPLE 9

*3-ethyl-2-2'-4'''-pyridylvinylbenzothiazolium toluene-p-sulphonate*

2-methylbenzothiazole (5.0 g.) and ethyl toluene-p-sulphonate (6.7 g.) were fused in an oil bath at 140° for 3 hours. The melt was cooled and pyridine-4-aldehyde (3.6 g.), ethanol (20 ml.) and piperidine (0.4 ml.) added. The mixture was boiled under reflux for 30 minutes and then cooled to 0°. After standing for some hours, a crystalline mass was present which was filtered off, washed well with acetone and recrystallised from ethanol to give the pure product as fine yellow needles, M. Pt. 198–200°.

EXAMPLE 10

*3-ethyl-2-2'-4'''-pyridylvinylbenzothiazolium chloride*

The product of Example 1 (5.0 g.) was dissolved with stirring in m-cresol (125 ml.) at 100°. Freshly precipitated and dried silver chloride (3.1 g.) was added and the mixture stirred at 100° for 90 minutes. The solid was then filtered off and washed with hot methanol (2 x 10 ml.). The total filtrates were then diluted with dry ether (1250 ml.) to precipitate a yellow solid. After leaving for a while, this latter solid was filtered off and recrystallised from ethanol to give the pure product as yellow needles, M. Pt. 206–7°.

EXAMPLE 11

1-ethyl-2-2'-4'''-pyridylvinylpyridinium iodide was prepared from α-picoline ethiodide and pyridine-4-aldehyde by a method similar to that of Example 1 and purified by boiling out with acetone to leave the pure product as pale buff needles, M. Pt. 150–2°.

EXAMPLE 12

1-methyl-2-2'-4'''-pyridylvinylpyridinium iodide was prepared from α-picoline methiodide and pyridine-4-aldehyde by a method similar to that of Example 1 and obtained as buff needles, M. Pt. 180–2°.

EXAMPLE 13

5 - chloro-3-ethyl-2,2'-4''' - pyridylvinylbenzothiazolium iodide was obtained from 5-chloro-3-ethyl-2-methylbenzothiazolium iodide and pyridine-4-aldehyde by a method similar to Example 1 and crystallised from ethanol as small orange rhombs, M. Pt. 198°.

EXAMPLE 14

3 - ethyl-5:6-dimethoxy-2,2'-4'''-pyridylvinylbenzothiazolium iodide was obtained from 5:6-dimethoxy-3-ethyl-2-methylbenzothiazolium iodide and pyridine-4-aldehyde by a method similar to that of Example 1 and purified by boiling out with ethanol to give the product as yellow microcrystals, M. Pt. 236°.

In the production of direct positive emulsions according to the invention, the selected compound of the type defined is included in the silver chloride emulsion in an amount which is preferably from 0.1 to 2 gm. of the compound per 100 gms. of silver chloride. The emulsion may be pre-fogged by exposure to light, but it is preferred to pre-fog the emulsion chemically, for example by including formaldehyde in the emulsion and allowing the emulsion to stand at elevated temperature. It is generally advantageous to include an optical bleaching agent, known per se, in the emulsion or in the support on which the emulsion is coated.

The following example will serve to illustrate the production of direct positive emulsions according to the invention:

EXAMPLE 15

4.4 litres of a washed photographic emulsion containing 188 g. silver chloride and adjusted to a pH of 10 were treated with 12 ml. of a 4% solution of formaldehyde. After heating for 35 minutes at 125° F., the emulsion was neutralised by addition of citric acid and cooled. There was then added 2 g. of the compound produced by Example 1 or 2 above dissolved in 100 ml. of formamide and 120 ml. of a 5% aqueous solution of Tinopal 2BP (a commercial optical bleaching agent). The emulsion was coated on paper.

On exposure and development the coated paper yielded a direct positive image of high quality.

Similar results were obtained using, instead of the stated compound, similar quantities of other compounds of the series and of other quaternary salts such as the alkyl halides, alkyl sulphates, sulphonates and the like.

The desensitising compounds characteristic of this invention have the important advantage of yielding images substantially free from colour stain. This is particularly the case when the emulsions contain optical bleaching agents of anionic character since the laking with cationic desensitisers as hitherto employed is avoided.

What we claim is:

1. A direct positive photographic element comprising a gelatino silver halide emulsion of which the silver halide consists essentially of silver chloride and which is fogged so that on photographic development it is uniformly rendered a solid black, said emulsion containing a desensitising compound of the general formula:

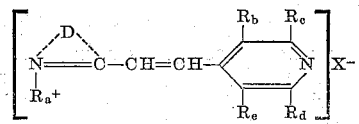

where D represents the non-metallic atoms necessary to complete a heterocyclic nucleus selected from the class consisting of the oxazole series, thiazole series, selenazole series and the series of benzene and naphthalene homologues thereof, pyridine series, quinoline series, α and β-naphthoquinoline series, indolenine series, pyrimidine series, pyridazine series, oxazoline series, thiazoline series and selenazoline series, $R_a$ is selected from the class consisting of alkyl and aralkyl groups, $R_b$, $R_c$, $R_d$ and $R_e$ are selected from the class consisting of hydrogen atoms and alkyl, aryl and aralkyl groups, and X is an anion.

2. A direct positive photographic element according to claim 1 wherein the emulsion is fogged by treatment with formaldehyde.

3. A direct positive photographic element according to claim 1 wherein the emulsion is fogged by light.

4. A direct positive photographic element according to claim 1 wherein the proportion of desensitising compound is 0.1 to 2 g. per 100 g. of silver chloride.

References Cited in the file of this patent

UNITED STATES PATENTS

| | | |
|---|---|---|
| 2,265,907 | Kendall | Dec. 9, 1941 |
| 2,541,472 | Kendall et al. | Feb. 13, 1951 |